United States Patent [19]
Harris

[11] Patent Number: 5,184,464
[45] Date of Patent: Feb. 9, 1993

[54] NOISE AND EMMISSION CONTROL APPARATUS

[75] Inventor: Harold L. Harris, Houston, Tex.

[73] Assignee: Harris International Sales Corporation, Houston, Tex.

[21] Appl. No.: 688,674

[22] Filed: Apr. 22, 1991

[51] Int. Cl.⁵ .............................................. F01N 3/28
[52] U.S. Cl. ........................................ 60/299; 60/320; 422/173
[58] Field of Search ................. 60/299, 298, 320, 321; 422/173, 180

[56] References Cited

U.S. PATENT DOCUMENTS

| | | | |
|---|---|---|---|
| 4,426,844 | 1/1984 | Nakano | 422/173 |
| 4,601,168 | 7/1986 | Harris | 422/176 |

Primary Examiner—Douglas Hart
Attorney, Agent, or Firm—Bill B. Berryhill

[57] ABSTRACT

Improved noise and emission control apparatus for use with an internal combustion engine which include an enclosed cylindrical housing. Mounted in the housing is: noise reduction apparatus, catalytic converter apparatus and heat exchange apparatus. The heat exchange apparatus transfers heat from engine exhaust gases to a fluid passing through the housing.

10 Claims, 1 Drawing Sheet

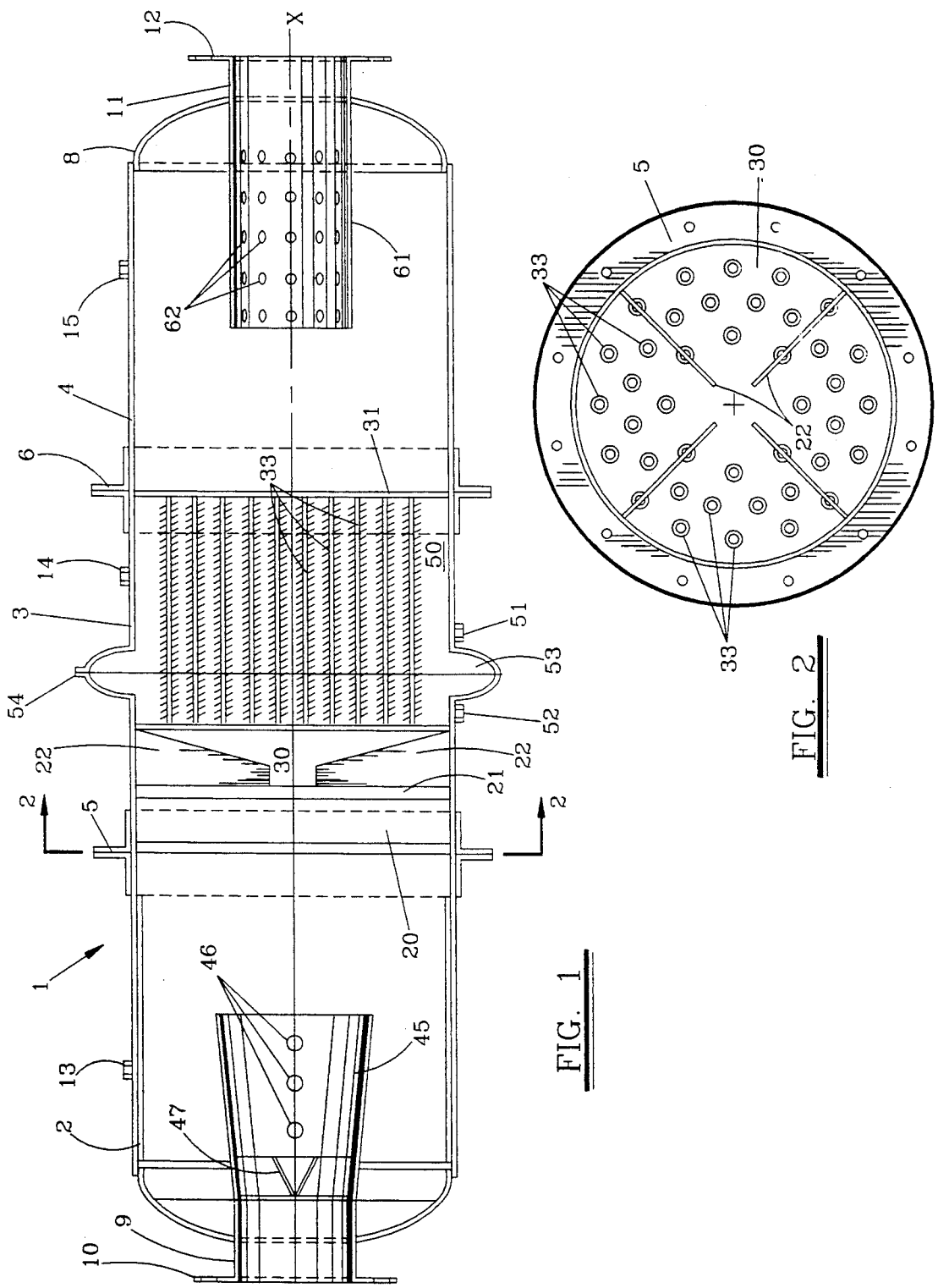

NOISE AND EMMISSION CONTROL APPARATUS

BACKGROUND OF THE INVENTION

1. Field of the Invention

The present invention pertains to apparatus for use with internal combustion engines for reducing noise, noxious components of exhaust gases emitted therefrom and recovering heat from the exhaust gases thereof. More specifically, the present invention pertains to apparatus, mounted in a single housing, which provides combined functions of noise silencing, reduction of noxious gas components and recovery of useable heat from the exhaust of an internal combustion engine, particularly naturally gas-fueled engines.

2. Brief Description of the Prior Art

Silencers or mufflers for internal combustion engines have been in existence for many years. Most industrial silencers use some type of shell or housing in which is mounted various types of baffles for reducing noise produced at the exhaust of an internal combustion engine. In recent years, attention has also been directed to reducing the noxious gases emitted in the exhaust of an internal combustion engine, e.g. nitrogen oxide, carbon monoxide and other unburned hydrocarbons. Equipment for reducing noxious emissions from internal combustion engines usually provide some type of catalyst which converts gases to water, nitrogen, carbon dioxide and other harmless emissions.

Most exhaust emission control apparatus, particularly those for silencing and reducing the noxious emissions of internal combustion engines in industrial applications utilize separate devices for noise reduction and noxious gas reduction. In recent years, apparatus has been provided which has the combined function of noise and emission control in a single enclosed housing. Examples of such are shown in U.S. Pat. Nos. 4,209,493 and 4,601,168.

Some of the heat of combustion of an internal combustion engine is usually dissipated to a cooling fluid which circulates through the engine and then releases heat to the atmosphere through a radiator. Additional heat energy is lost to the atmosphere through escaping hot gases. In many cases, it would be desirable to recover and utilize the heat energy from the heat of combustion of the engine and the heat of recombustion of a catalytic muffler. Some attempts have been made to recover heat energy from exhaust gases. U.S. Pat. No. 4,777,796 discloses a muffler system which recovers heat energy of exhaust gases by spraying a fluid into the exhaust stream to absorb the heat energy, collecting the heated fluid at the bottom of the muffler vessel and transferring heat to a second fluid via a counter-current liquid-to-liquid heat exchanger. A combination catalytic muffler and heat recovery system is also disclosed in U.S. Pat. No. 4,426,844. However, this system, designed primarily for a two-cycle engine driven refrigerant compressor of a room cooling system would probably be inadequate for a large industrial internal combustion engine.

SUMMARY OF THE INVENTION

An object of the present invention is to provide combination noise and emission control apparatus for use with an internal combustion engine which also has an additional function, the recovery of heat energy from the exhaust gases. This is accomplished by providing an enclosed cylindrical housing in which noise reduction components are provided for reducing noise emitted from the engine, converter means is provided for reducing noxious components of exhaust gases emitted from the engine and heat exchange means is provided for transferring heat from the exhaust gases to another fluid by which the recovered heat can be utilized.

The noise reduction components of the apparatus of the present invention may include one or more tubular devices which are coaxially aligned with the housing axis or parallel thereto. The walls of such tubular components may be perforated by plurality of holes to allow free flow of exhaust gases therethrough.

The converter components of the apparatus of the present invention include a catalytic converter for reducing noxious gases emitted from the engine by converting nitrogen oxides, carbon monoxides and unburned hydrocarbons to less noxious compounds. At least one catalytic cell is transversely disposed in the housing of the apparatus so that all of the exhaust gases must travel therethrough prior to discharge from the apparatus.

The heat exchange components of the present invention are mounted in a compartment of the housing and is provided with a tube assembly through which the exhaust gases preferably pass for heat exchange with a fluid which surrounds the tube assembly. Fluid so heated then is allowed to exit the apparatus for its desired use.

Thus, the improved noise and emission control of the present invention provides gas emission control, noise reduction and heat recovery in a common housing to conserve space, improve waste heat recovery and provide reduction of noxious gas emissions and noise in a much more efficient manner. Installation and maintenance costs are reduced. Pressure drop is less than systems which utilize separate components. Operation is more efficient. Many other objects and advantages of the invention will be apparent from reading the description which follows in conjunction with the accompanying drawings.

BRIEF DESCRIPTION OF THE DRAWINGS

FIG. 1 is a longitudinal view, in section, of combination noise and emission control apparatus according to a preferred embodiment of the invention; and FIG. 2 is a cross-sectional view of the combination noise and emission control apparatus of FIG. 1, taken along lines 2—2 thereof.

DESCRIPTION OF A PREFERRED EMBODIMENT

Referring first to FIGS. 1 and 2, there is shown a combination noise and emission control apparatus which includes a cylindrical housing, 1 which may actually be made of three cylindrical sections 2, 3, 4 joined at support rings 5 and 6 by bolting, welding or any other suitable method, enclosed at opposite ends by heads 7 and 8. The head 7 is provided with an inlet 9 surrounding which is a flange 10 by which the apparatus may be connected to the exhaust (not shown) of an internal combustion engine (not shown). The opposite head 8 is provided with an outlet 11 surrounding which is a flange 12. The flange 12 may be connected to a discharge pipe (not shown) for discharge into the atmosphere or for additional handling. Sample ports such as 13, 14 and 15 may be provided for sensing temperature, pressure, gas analysis, etc.

Transversely disposed in the housing 1 at a fixed distance from the housing inlet 9 is at least one catalytic cell 20. The catalytic cell 20 is normally made of metallic substances and compounds which are effective in converting nitrogen oxide, carbon monoxide and other unburned hydrocarbons to nitrogen, carbon dioxide, water and other harmless products. The cell 20, illustrated in FIG. 1, is a cylindrical cell, coaxially aligned with the axis x—x of the cylindrical housing 1. The catalytic cell 20 is held in place by the walls of the housing 1, a circular support member 21 and radial support members 22 which are welded or bolted to the inside walls of the housing 1. These support members 21, 22 support the cell 20 against stress and pressure from backfire explosions and other occurrences.

Immediately downstream of the catalytic cell 20 is a cylindrical compartment 50 partially defined at one end by an upstream tube sheet 30 and at the opposite end by a downstream tube sheet 31. A plurality of parallel tubes 33 having inlets at the upstream tube sheet 30 and outlets at the downstream tube sheet 31 are disposed in the cylindrical compartment 50. These tubes 33 may be provided with circular or spiral fins to provide greater heat transfer surfaces. The tube sheets 30 and 31 are perforated only at the inlets and outlets of the tubes 33. Thus, all exhaust gases flowing through the housing 1 must pass through these tubes 33 prior to exit from the housing 1. Conversely, the exhaust gases may not enter the space surrounding the tubes 33 between the tube sheet 30 and 31.

The space surrounding the tubes 33 in the compartment 50 is the space through which water or other fluid may be passed for heat exchange with the exhaust gases passing through the tubes 33. Such water or fluid enters the compartment 50 through an inlet 51, is heated and exits through an outlet 52. An annular recess 53 with a vent fitting 54 may be provided for venting of the compartment 50.

Centrally supported in the inlet compartment 40 is an inlet silencer/diffuser tube 45 one end of which is connected to the inlet 9 and the opposite end of which terminates somewhere near the mid-section of the inlet chamber 40. The walls of the silencer/diffuser tube 45 may be perforated with a plurality of holes 46 and may be flared outwardly from inlet 9 toward the catalytic cell 20. A conical diffuser 47 may be centrally disposed within the throat of the silencer/diffuser tube 45. The diffuser 47 and the flared shape of the silencer/diffuser tube 45 aids in diffusing and distributing exhaust gases across the catalytic cell 20.

Attached to the outlet 11 and extending in a direction toward the heat exchanger compartment 50 is an outlet tube 61. The walls of the outlet tube 61 are perforated by a plurality of holes 62 allowing gases to enter and exit the tube 61 therethrough. The silencer/diffuser tube 45 and the outlet tube 61 provide baffling and noise reduction. Of course, additional noise reduction components could be installed in the inlet compartment 40 and/or outlet compartment 60.

In operation, exhaust gases from an internal combustion engine with which the apparatus of the present invention is used, first flow through the inlet 9 and silencer/diffuser tube 45 for relatively even distribution into the inlet compartment 40. From the inlet compartment 40, these exhaust gases pass through the catalytic cell 20 for conversion into less noxious gases. From the catalytic converter cell 20, the exhaust gases pass through the fin tubes 33 into the outlet compartment 60 for eventual exit through the outlet 11. As the heated exhaust gases, additionally heated by recombustion in the catalytic cell 20, pass through the tubes 33, some of the heat therefrom is transferred through the walls and fins of the tubes 33 to the surrounding water or other fluid in the heat exchange compartment 50. Unheated fluid flows into the compartment through inlet 51 and heated fluid flows out of the compartment through the outlet 52. Movement of the fluid to be heated can be accomplished by gravity, pumps, etc. The heated fluid can then be transferred to a location where it can be used for heating rooms, providing heat to industrial processes, etc.

Thus, the combination noise and emission control apparatus of the present invention provides apparatus which efficiently reduces noise and emission of noxious gas components from the exhaust of an internal combustion engine. Additionally, it provides a means by which heat, normally lost to the atmosphere, can be recovered for useful purposes. The combined design is one of great efficiency, simple manufacture and operation.

A single embodiment of the present invention has been described herein. However, many variations can be made without departing from the spirit of the invention. Accordingly, it is intended that the scope of the invention be limited only by the claims which follow.

I claim:

1. Improved noise and emission control apparatus for use with an internal combustion engine comprising:
    an enclosed cylindrical housing having an inlet at one end thereof for connection with the exhaust of said engine and having an outlet at the opposite end thereof;
    noise reduction means mounted in said housing for reducing noise emitted from said engine, said noise reduction means comprising at least two tubular members the walls of which are perforated and whose axes are coaxially aligned with the axis of said cylindrical housing, one of said tubular members being connected to said housing inlet and the other of said tubular members being connected to said housing outlet;
    converter means mounted in said housing downstream of said first tubular member and upstream of said second tubular member for reducing noxious components of exhaust gases emitted from said engine; and
    heat exchange means mounted in said housing immediately downstream of said converter means for transferring heat from said exhaust gases to a fluid which passes through said housing, said exhaust gases passing through said heat exchange means prior to exiting through said second tubular member and said outlet.

2. The improved noise and emission control apparatus of claim 1 in which said heat exchange means comprises a cylindrical compartment partially defined by surrounding walls of said housing and at one end by an upstream tube sheet and at the opposite end by a downstream tube sheet and being provided with a plurality of parallel tubes having inlets at said upstream tube sheet and outlets at said downstream tube sheet, one of said exhaust gases and said fluid passing through said tubes and the other of said exhaust gases and said fluid surrounding said tubes, heat being transferred from said exhaust gases to said fluid through the walls of said tubes.

3. The improved noise and emission control apparatus as set forth in claim 2 in which said exhaust gases pass though said tubes from said inlets to said outlets thereof, said fluid passing through said cylindrical compartment in contact with the exterior of said tubes for heat exchange with said exhaust gases through the walls of said tubes.

4. The improved noise and emission control apparatus as set forth in claim 3 including a fluid inlet by which said fluid enters said cylindrical compartment and a fluid outlet by which said fluid exits said cylindrical compartment after transfer of heat thereto from said exhaust gases.

5. The improved noise and emission control apparatus as set forth in claim 4 including vent means in said cylindrical compartment for venting pressure therein.

6. Improved noise and emission control apparatus for use with an internal combustion engine comprising:
   an enclosed cylindrical housing having an inlet at one end thereof for connection with the exhaust of said engine and having an outlet at the opposite end thereof;
   noise reduction means mounted in said housing for reducing noise emitted from said engine;
   converter means mounted in said housing for reducing noxious components of exhaust gases emitted from said engine; and
   heat exchange means mounted in said housing immediately downstream of said converter means for transferring heat from said exhaust gases to a fluid which passes through said housing, said heat exchange means comprising a cylindrical compartment, partially defined by surrounding walls of said housing and partially defined at one end by an upstream tube sheet and at the opposite end by a downstream tube sheet, and a plurality of parallel tube having inlets at said upstream tube sheet and outlets at said downstream tube sheet and outlets at said downstream tube sheet, said exhaust gases passing directly from said converter means through said tubes and said fluid passing through the area surrounding said tubes, heat being transferred from said exhaust gases to said fluid through the walls of said tubes.

7. The improved noise and emission control apparatus of claim 2 in which said parallel tubes are provided with fins thereon to increase the area of heat transfer.

8. The improved noise and emission control apparatus of claim 2 in which said converter means includes a catalytic cell, transversely disposed in said cylindrical housing for converting nitrogen oxide, carbon monoxide and unburned hydrocarbons of said exhaust gases to less noxious compounds for discharge through said cylindrical housing outlet.

9. The improved noise and emission control apparatus of claim 8 in which said cylindrical housing is divided into three compartments: an inlet compartment in which catalytic cell is disposed, an intermediate compartment in which said heat exchange means is disposed and an outlet compartment through which converted and cooled exhaust gases pass prior to discharge through said cylindrical housing outlet.

10. The improved noise and emission control apparatus as set forth in claim 9 in which said noise reduction means includes noise reduction elements located in both said inlet compartment and said outlet compartment.

* * * * *